United States Patent
Sawada (10) Patent No.: US 8,847,461 B2
(45) Date of Patent: Sep. 30, 2014

(54) SPLIT STATOR CORE HAVING SPECIFIC DIMENSIONS AND MOTOR INCLUDING SAME

(75) Inventor: Tomoyoshi Sawada, Kyoto (JP)

(73) Assignee: Nidec Corporation, Kyoto (JP)

( * ) Notice: Subject to any disclaimer, the term of this patent is extended or adjusted under 35 U.S.C. 154(b) by 198 days.

(21) Appl. No.: 13/307,118

(22) Filed: Nov. 30, 2011

(65) Prior Publication Data
US 2012/0139385 A1 Jun. 7, 2012

(30) Foreign Application Priority Data
Dec. 1, 2010 (JP) ................................. 2010-268428

(51) Int. Cl.
*H02K 1/06* (2006.01)
*H02K 1/14* (2006.01)
*H02K 1/18* (2006.01)

(52) U.S. Cl.
CPC ............... *H02K 1/148* (2013.01); *H02K 1/185* (2013.01)
USPC ...... 310/216.111; 310/216.008; 310/216.083; 310/216.097

(58) Field of Classification Search
CPC .................................................. H02K 1/148
USPC .................... 310/216.074, 216.007–216.009, 310/216.023–216.045, 216.061, 216.097, 310/216.109, 216.111, 216.004, 158
IPC ................................................. H02K 1/14, 1/18
See application file for complete search history.

(56) References Cited

U.S. PATENT DOCUMENTS

| | | | | |
|---|---|---|---|---|
| 3,124,735 A | * | 3/1964 | Sampietro et al. | ........ 318/400.41 |
| 3,809,938 A | * | 5/1974 | Sjoberg et al. | ......... 310/216.082 |
| 4,383,213 A | * | 5/1983 | Tyrner | ............................ 322/53 |
| 7,148,601 B2 | * | 12/2006 | Yang et al. | ............. 310/216.044 |
| 7,382,076 B2 | * | 6/2008 | Miyamori et al. | ..... 310/216.091 |

(Continued)

FOREIGN PATENT DOCUMENTS

| | | |
|---|---|---|
| JP | 50-064905 U | 10/1973 |
| JP | 08-111968 A | 4/1996 |

OTHER PUBLICATIONS

Benedicic, B.; Kmecl, T.; Papa, G.; Korousic-Seljak, B., "Evolutionary optimization of a universal motor," Industrial Electronics Society, 2001. IECON '01. The 27th Annual Conference of the IEEE, vol. 1, No., pp. 19,24 vol. 1, 2001.*

*Primary Examiner* — Tran Nguyen
*Assistant Examiner* — Thomas Truong
(74) *Attorney, Agent, or Firm* — Keating & Bennett, LLP (57) ABSTRACT

A stator core includes three split cores, each of the split cores including a core-back portion including an inner surface facing a rotor, a tooth base portion protruding radially inwards from the inner surface of the core-back portion and a pair of tooth overhang portions protruding from both sides of a tip end of the tooth base portion in a circumferential direction. The inner surface of the core-back portion including a pair of orthogonal surface regions extending from both sides of a base end of the tooth base portion in a direction orthogonal or substantially orthogonal to the tooth base portion, the orthogonal surface regions extending radially outwards beyond projection positions of tip ends of the tooth overhang portions when the tooth overhang portions are projected on an imaginary plane including the orthogonal surface regions in parallel or substantially in parallel to the tooth base portion.

20 Claims, 10 Drawing Sheets

(56) References Cited

U.S. PATENT DOCUMENTS

| | | | |
|---|---|---|---|
| 2001/0030483 A1* | 10/2001 | Masumoto et al. | 310/216 |
| 2004/0150287 A1* | 8/2004 | Wainio et al. | 310/218 |
| 2009/0267443 A1* | 10/2009 | Kim | 310/216.109 |
| 2009/0295251 A1* | 12/2009 | Vollmer et al. | 310/195 |
| 2010/0054971 A1* | 3/2010 | Li et al. | 417/423.7 |

* cited by examiner

Fig.10
Prior Art

SPLIT STATOR CORE HAVING SPECIFIC DIMENSIONS AND MOTOR INCLUDING SAME

BACKGROUND OF THE INVENTION

1. Field of the Invention

The present invention relates to a stator core and more specifically, to a stator core that is suitable for high-speed rotation and a motor including such a stator.

2. Description of the Related Art

Figure 9:
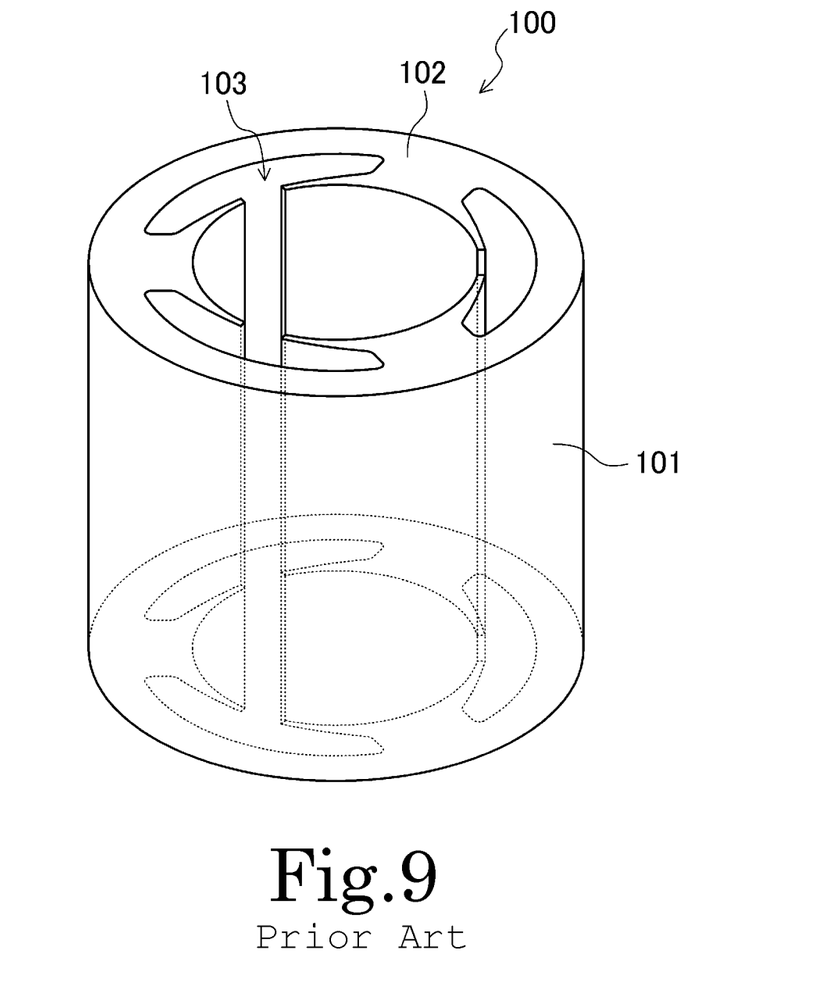
FIG. 9 is a schematic perspective view illustrating a conventional three-slot stator core.

A three-slot stator core is known to be a stator core that is suitable for high-speed rotation. A one-piece type stator core 100 as shown in FIG. 9 is generally used as the stator core mentioned above. Referring to FIG. 9, the stator core 100 includes a core-back portion 101 and teeth portions 102. Coils are provided in the respective teeth portions 102. Slots 103 for accommodating the coils are formed between the adjoining teeth portions 102.

Figure 10:
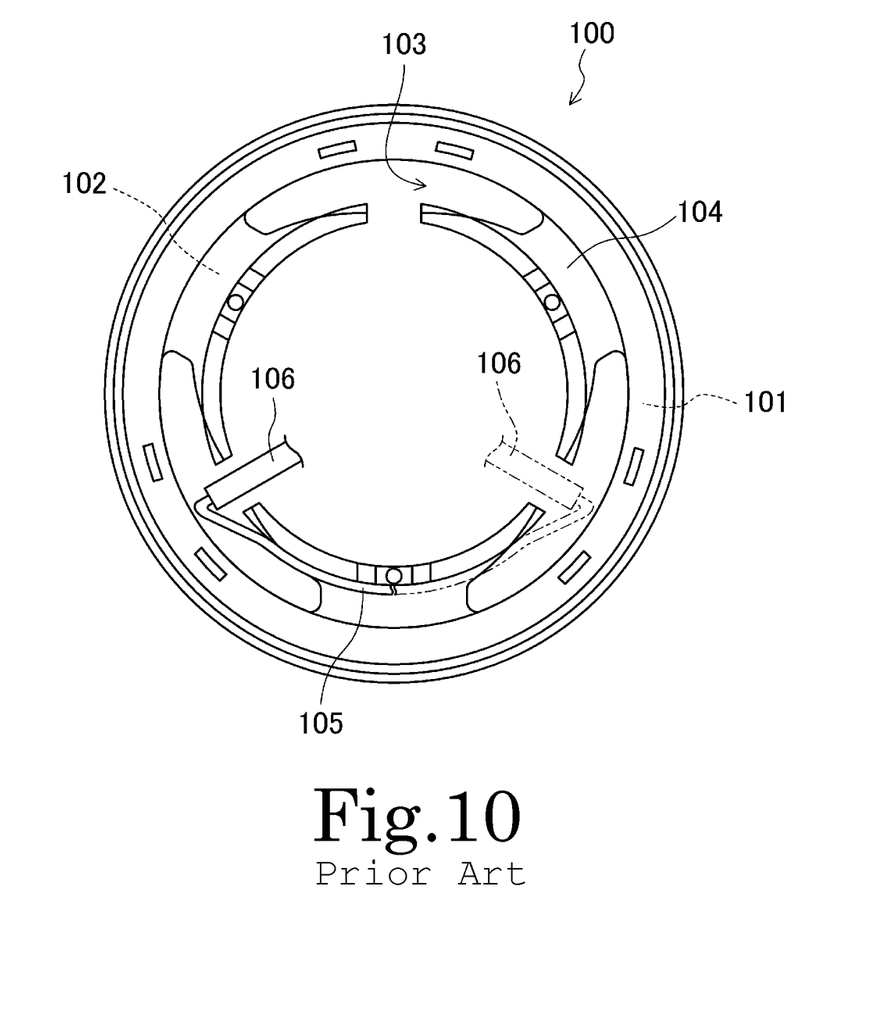
FIG. 10 is a schematic plan view explaining a conventional winding process.

As shown in FIG. 10, the coils are formed by winding a conductive wire 105 on the teeth portions 102 through insulators 104. A dedicated winding machine is used in winding the conductive wire 105. The winding machine is provided with a nozzle 106 for feeding the conductive wire 105 from a tip end thereof. The nozzle 106 revolves around each of the teeth portions 102 along a specified orbit, whereby the conductive wire 105 is wound on each of the teeth portions 102. A pair of wire ends drawn out from each of the coils is connected to specific terminals. Each of the coils is electrically connected to an external power source or the like through the terminals.

As an example of a conventional high-speed motor, Japanese Utility Model Application Publication No. S50-64905 (JP50-64905A (Utility Model)) discloses a six-slot motor core (stator core) in which a magnetic-pole end surface of a coil groove is substantially perpendicular to the other surface extending from the magnetic-pole end surface.

Japanese Patent Application Publication No. H8-111968 (JP8-111968A) discloses another conventional motor having a six-slot stator core in which the side of a slot facing a core back is provided perpendicularly to the side facing the teeth of the stator core. An one example thereof, there is illustrated a stator core having the same number of sides as the number of teeth and having an external form with a polygonal cross section.

SUMMARY OF THE INVENTION

In accordance with one preferred embodiment of the present invention, a stator core for a motor includes three split cores arranged to surround a rotatably-held rotor, each of the split cores including a core-back portion including an inner surface facing the rotor, a tooth base portion protruding radially inwards from the inner surface of the core-back portion and a pair of tooth overhang portions protruding from both sides of a tip end of the tooth base portion in a circumferential direction. The core-back portions are connected at circumferential ends thereof to one another to define a substantially cylindrical shape, the inner surface of the core-back portion including a pair of orthogonal surface regions extending from both sides of a base end of the tooth base portion in a direction orthogonal or substantially orthogonal to the tooth base portion, the orthogonal surface regions extending radially outwards beyond projection positions of tip ends of the tooth overhang portions when the tooth overhang portions are projected on an imaginary plane including the orthogonal surface regions in parallel or substantially in parallel to the tooth base portion.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

In the case of the stator cores having increased slot numbers disclosed in JP50-64905A (Utility Model) and JP8-111968A, the circumferential dimension of each of the teeth portions becomes relatively small as the central angle allotted to each of the teeth portions grows smaller. In the winding process, it is therefore possible to insert the nozzle of the winding machine into the slot relatively easily. Accordingly, the stator core having an increased slot number involves no conspicuous problem in the winding process. JP50-64905A (Utility Model) and JP8-111968A disclose slots that are arranged to facilitate a winding process but only with respect to winding a conductive wire with increased density.

In the case of a three-slot stator core, as shown in FIG. 10, the central angle allotted to each of the teeth portions is 120 degrees and, therefore, the circumferential dimension of each of the teeth portions 102 grows larger. In order for the nozzle 106 to revolve around each of the teeth portions 102, it is necessary to insert the nozzle 106 into the stator core 100 and to largely move the tip end of the nozzle 106 not only in the axial direction of the stator core 100 but also in the circumferential direction thereof. As a consequence, the revolving orbit of the nozzle 106 becomes complicated, which requires the use of a complex winding machine and also makes the winding process time-consuming.

In a case where the tip end of the nozzle 106 comes into the slot 103 as shown in FIG. 10, it becomes difficult to wind the conductive wire 105 on the base end region of each of the teeth portions 102 if only the conductive wire 105 is caught in the tip end region of each of the teeth portions 102. As a result, the conductive wire 105 is lopsidedly wound on the tip end region of each of the teeth portions 102. This makes it necessary to push the conductive wire 105 toward the base end region of each of the teeth portions 102 after the winding process.

A stator core in accordance with a preferred embodiment of the present invention includes three split cores of the same shape connected to one another and arranged to surround a rotatably-held rotor. Each split core preferably includes a core-back portion, a tooth base portion and a pair of tooth overhang portions. The core-back portions of the respective split cores are connected to one another at the circumferential ends thereof to have a cylindrical shape. The tooth base portion protrudes radially inwards from the inner surface of the core-back portion facing the rotor. The tooth overhang portions protrude from the both sides of the tip end of the tooth base portion in the circumferential direction.

The inner surface of the core-back portion preferably includes a pair of orthogonal surface regions extending from both sides of the base end of the tooth base portion in the direction substantially orthogonal to the tooth base portion. When the respective tooth overhang portions are projected toward an imaginary plane including the orthogonal surface regions in parallel or substantially in parallel to the tooth base portion, the orthogonal surface regions extend radially outwards beyond the projection positions of the tip ends of the respective tooth overhang portions.

As set forth above, the stator core is defined by interconnecting three split cores of the same shape. It is therefore possible to perform a winding process for each and every split core. Since the conductive wire can be wound around the tooth base portion whose periphery is open, it is possible to perform the winding process with ease.

An imaginary plane is set which includes the orthogonal surface regions extending from the base end of the tooth base portion in the direction orthogonal or substantially orthogonal to the tooth base portion. If the tooth overhang portions are projected toward the imaginary plane in parallel or substantially in parallel to the tooth base portion, the orthogonal surface regions extend radially outwards beyond the projection positions of the tip ends of the respective tooth overhang portions protruding from the tip end of the tooth base portion in the circumferential direction.

In other words, the orthogonal surface regions of the core-back portion protrude beyond the tooth overhang portions in the circumferential direction. Therefore, while keeping a nozzle of a winding machine parallel or substantially parallel to the tooth base portion, the tip end portion of the nozzle can be inserted to such a position so as to make contact with the orthogonal surface regions, with no likelihood of contact with the tooth overhang portions.

Thus, the movement of the nozzle is minimized because it is only necessary that the nozzle be caused to revolve around the tooth base portion while keeping the nozzle parallel or substantially parallel to the tooth base portion. This eliminates the need to use a winding machine that is capable of setting a complicated nozzle motion, which assists in simplifying the winding equipment. Moreover, the winding time is shortened and the number of motors manufactured per unit time is thus increased. In addition, the conductive wire can be uniformly wound on the tooth base portion from the base end to the tip end. This eliminates the possibility that the conductive wire will be lopsidedly wound on the tip end region of the tooth base portion. Therefore, there is no need to perform a process of pushing the conductive wire inwards to correct lopsidedness.

For example, if each split core includes an insulator provided on the surface thereof, it is preferred that, when the respective tooth overhang portions are projected toward an imaginary plane including the orthogonal surface regions of the core-back portion provided with the insulator in parallel or substantially in parallel to the tooth base portion, the orthogonal surface regions extend radially outwards beyond the projection positions of the tip ends of the respective tooth overhang portions.

It is typical that an insulator is provided between the stator core and the coils in order to secure insulation. In this case, it is preferred that the orthogonal surface regions extend radially outwards beyond the projection positions of the tip ends of the respective tooth overhang portions provided with the insulator.

For example, it is possible to easily perform a winding process with respect to the split cores provided with the insulator. Preferably, the inner surface of the core-back portion includes circumferentially-curved bending surface regions continuously extending from the outer ends of the respective orthogonal surface regions. This helps reduce the length of the core-back portion, which makes it possible to cut down the material cost and to reduce the magnetic resistance.

For example, the distance between the projection position of the tip end of each of the tooth overhang portions and the outer end of each of the orthogonal surface regions is preferably set to have a value of, for example, about 2 mm to about 3 mm greater than the diameter of the conductive wire wound on the tooth base portion. By setting the distance between the projection position and the outer end to have a value of, for example, about 2 mm to about 3 mm greater than the diameter of the conductive wire, the tip end portion of the nozzle can be inserted to such a position so as to make contact with the orthogonal surface regions while keeping the nozzle of the winding machine parallel or substantially parallel to the tooth base portion, with no or substantially no likelihood of contact with the tooth overhang portions.

For example, the radially outer surface of the core-back portion is preferably arranged parallel or substantially parallel to the orthogonal surface regions of the inner surface thereof. In the core-back portion, the magnetic flux density becomes lower as the distance from the inner surface of the core-back portion grows longer. In view of this, it is more efficient to provide the radially outer surface parallel or substantially parallel to the orthogonal surface regions of the inner surface. By providing the radially outer surface parallel or substantially parallel to the orthogonal surface regions of the inner surface, it is possible to reduce the weight of the core-back portion and to thus cut down the material cost of the core-back portion.

For example, it is preferred that the dimension of the gap provided between the tip ends of two adjoining tooth overhang portions when the split cores are connected to one another be set smaller than the distance between the projection position of the tip end of each of the tooth overhang portions and the outer end of each of the orthogonal surface regions. In the conventional one-piece type stator core, a gap having a specified dimension needs to be provided between the tip ends of the adjoining tooth overhang portions in order to insert the nozzle into the stator core. In the stator core of a preferred embodiment of the present invention, however, there is no such need because the winding process can be performed for each split core. If the tip ends of the adjoining tooth overhang portions are kept close to each other, cogging is suppressed and is magnetically smoothly changed over. This makes it possible to reduce the noise and vibration generated when a motor is driven.

For example, when a fastening hole extending in the rotation axis direction is to be provided in the stator core, it is preferable to provide the fastening hole in the area near the radially outer surface of the core-back portion radially opposing to the tooth base portion.

Magnetic resistance is increased if the fastening hole is provided in the core-back portion. Since magnetic flux is divisionally distributed at the both sides of the base end region of the tooth base portion, magnetic density remains low at the dividing point of the magnetic flux. If the fastening hole is arranged at the dividing point, it is possible to reduce the influence of increased magnetic resistance and to reduce the magnetic loss.

The motor provided with such a stator core can enjoy enhanced productivity and improved performance.

Preferred embodiments of the present invention will now be described in detail with reference to the accompanying drawings. The following description is nothing more than an exemplary illustration and is not intended to limit the application and use of the present invention.

Figure 1:
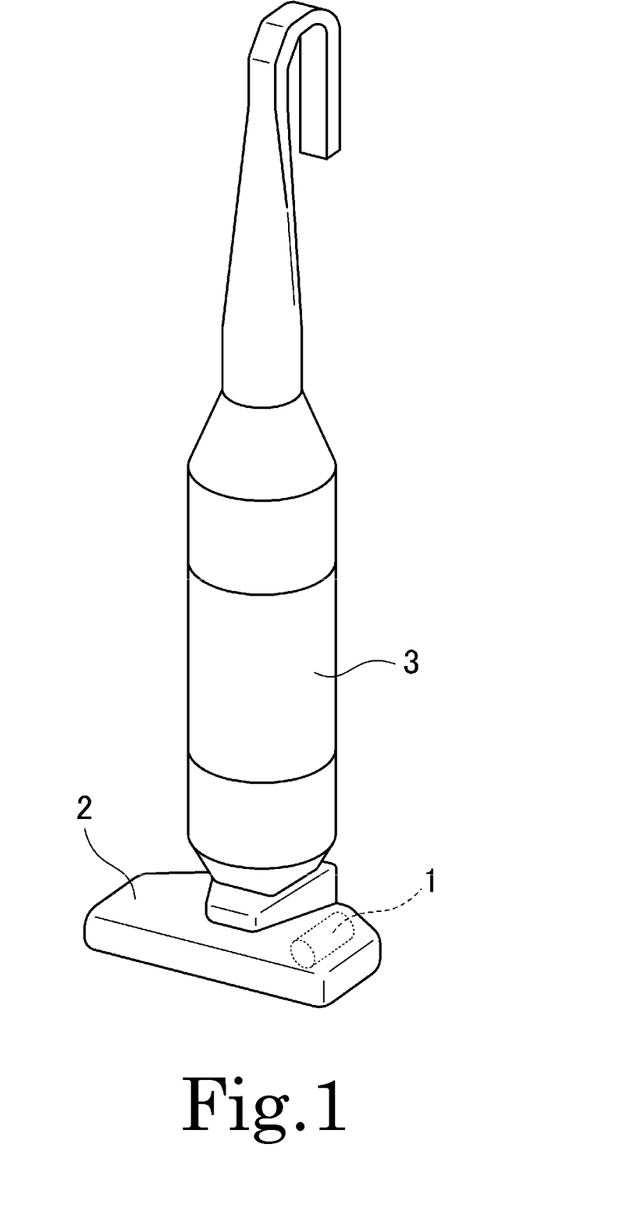
FIG. 1 is a schematic perspective view showing a cleaner applied with a motor according to a preferred embodiment of the present invention.

FIG. 1 shows a cleaner, such as, for example, a vacuum cleaner, including a motor 1 in accordance with one preferred embodiment of the present invention. The cleaner preferably includes a suction portion 2 arranged to draw dust and a storage portion 3 arranged to store dust. Although not shown in the drawings, a brush-mounted roller arranged to scrape dust is rotatably held by the suction portion 2. The motor 1 is provided within the suction portion 2 to rotationally drive a fan arranged to generate a suction force and the brush-mounted roller.

Figure 2:
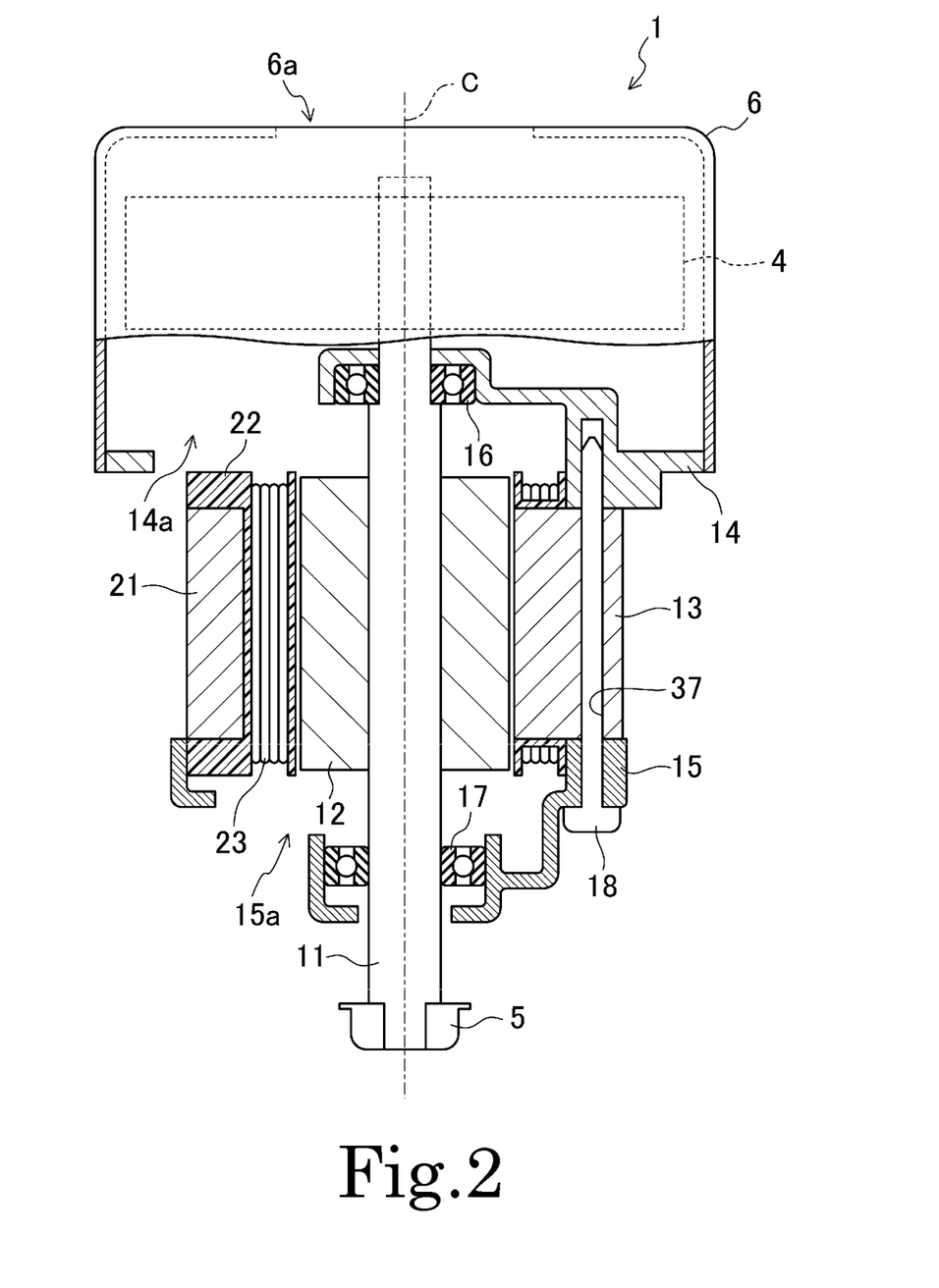
FIG. 2 is a schematic section view showing the motor according to a preferred embodiment of the present invention.

FIG. 2 shows the details of the motor 1. The motor 1 is an inner rotor type brushless motor. The motor 1 preferably includes a shaft 11, a rotor 12, a stator 13, a first bearing housing 14, and a second bearing housing 15. In the following description, the direction in which the center axis (rotation axis C) of the shaft 11 extends will be referred to as the "axial direction", the direction extending around the shaft 11 will be referred to as the "circumferential direction" and the direction orthogonal to the axial direction will be referred to as the "radial direction".

Both ends of the shaft 11 are arranged to protrude from the motor 1. A fan 4 is fixed to one end portion of the shaft 11 and a drive ring 5 arranged to rotationally drive the brush-mounted roller through, for example, a belt or the like is fixed to the other end portion of the shaft 11. The fan 4 is covered with a cup-shaped fan cover 6 including an air intake hole 6a defined at the central area thereof.

The rotor 12 having a cylindrical shape is preferably fixed to the middle portion of the shaft 11. The rotor 12 is preferably defined by a rotor core and rotor magnets. The rotor magnets are arranged on the outer circumferential portion of the rotor 12. The S-poles and N-poles of the rotor magnets are alternately arranged along the circumferential direction.

The shaft 11 is arranged to be rotatably supported by a first bearing 16 and a second bearing 17 such that the shaft 11 can rotate about the rotation axis C. The first bearing 16 supports the end portion of the shaft 11 near the fan 4. The first bearing 16 is supported on the first bearing housing 14. The second bearing 17 supports the end portion of the shaft 11 near the drive ring 5. The second bearing 17 is supported on the second bearing housing 15. The first bearing housing 14 and the second bearing housing 15 are arranged in an axially opposing relationship with each other. The stator 13 is interposed between the first bearing housing 14 and the second bearing housing 15. In this state, the first bearing housing 14, the second bearing housing 15 and the stator 13 are fastened together, preferably by, for example, a bolt 18.

An axially-opened ventilating window 14a is defined in the first bearing housing 14. An axially-opened ventilating window 15a is defined in the second bearing housing 15. When the motor 1 is rotationally driven, an air is drawn from the air intake hole 6a. The air flows toward the rotor 12 and the stator 13 through the ventilating windows 14a and 15a and then spouts from the ventilating window 15a toward the drive ring 5.

The stator 13 having a cylindrical shape is provided around the rotor 12 with a minute air gap left there between. The stator 13 preferably includes a stator core 21, an insulator 22, and coils 23.

Figure 3:
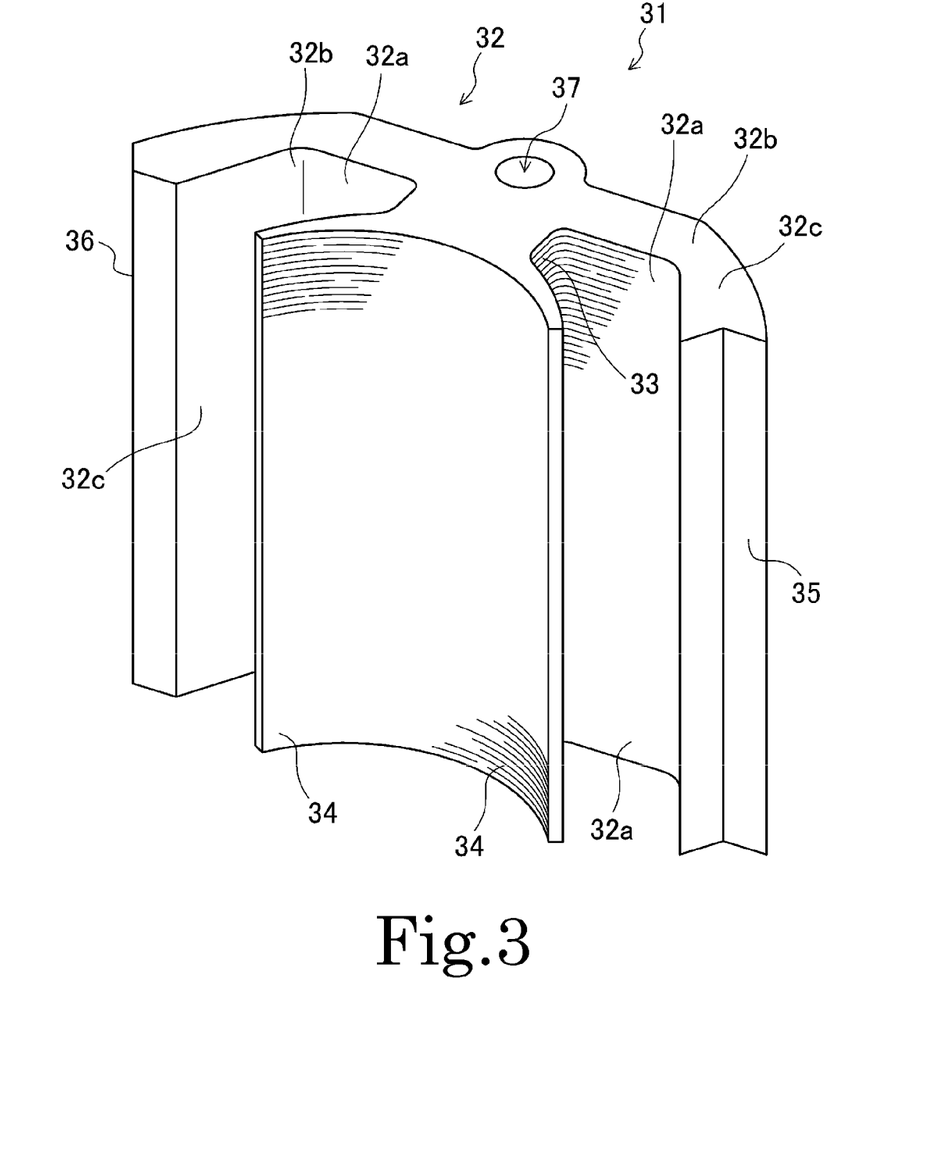
FIG. 3 is a schematic perspective view illustrating the outward appearance of a split core.
Figure 4:
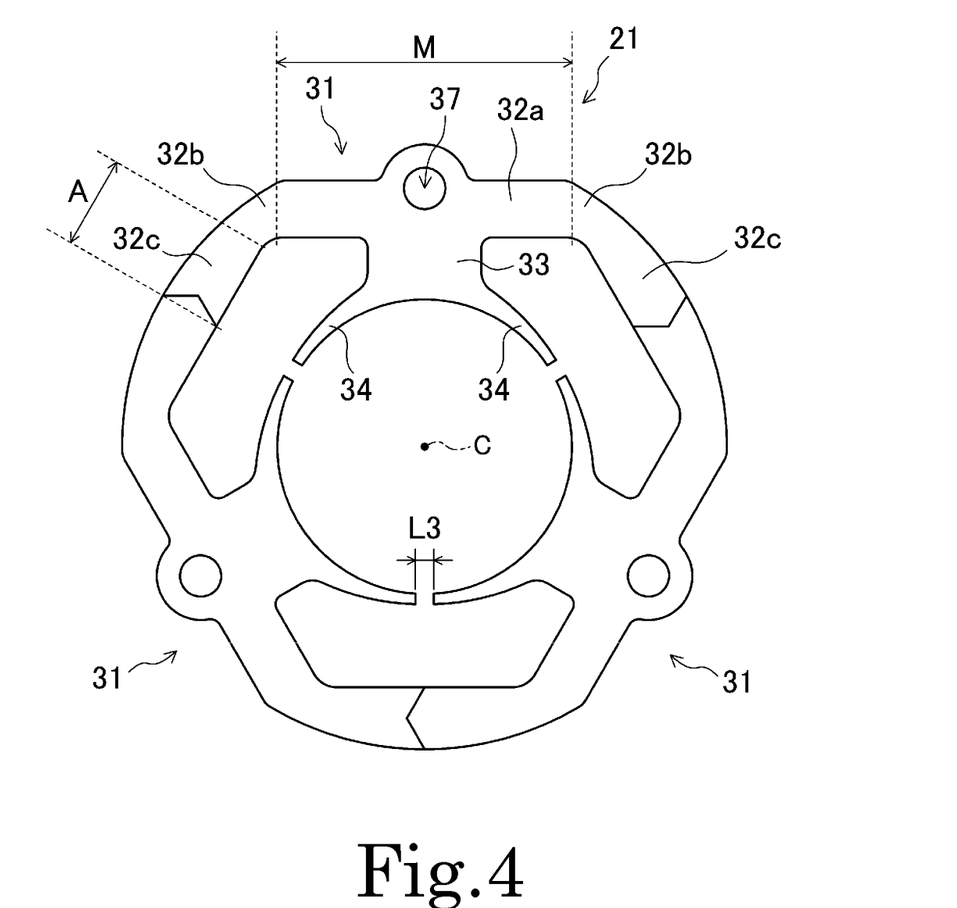
FIG. 4 is a schematic plan view of a stator core.

FIG. 3 shows the schematic configuration of a split core 31. FIG. 4 is a plan view of the stator core 21. The stator core 21 preferably includes three split cores 31 of the same shape or substantially the same shape connected to one another. The split cores 31 are preferably formed by axially laminating a plurality of metal plates one above another, however, any other stator core making method could also be used. Each split core 31 preferably includes a core-back portion 32, a tooth base portion 33, and a pair of tooth overhang portions 34.

The core-back portion 32 preferably includes a main wall 32a, a pair of bending walls 32b, and a pair of connecting walls 32c. The bending walls 32b are arranged to be joined to both circumferential ends of the main wall 32a and are bent in the circumferential direction. The connecting walls 32c are joined to the bending walls 32b and extend rectilinearly. As a preferred example, the length A of each of the connecting walls 32c is equal to or substantially equal to one half of the length M of the main wall 32a when seen in a plan view in FIG. 4. When two connecting walls 32c are joined to each other, the total sum of the length A of the two connecting walls 32c is equal to or substantially equal to the length of the main wall 32a.

An axially-extending triangular groove portion 35 is defined in the circumferential edge of one of the connecting walls 32c. An axially-extending triangular protrusion portion 36 is arranged in the circumferential edge of the other connecting wall 32c. The triangular protrusion portion 36 of the core-back portion 32 of each split core 31 is arranged to be fitted to the triangular groove portion 35 of the core-back portion 32 of the adjoining split core 31. Then, the split cores 31 are connected to one another preferably by, for example, welding or other methods, thereby providing the cylindrical stator core 21 having a cross section of substantially triangular shape or substantially hexagonal shape.

An axially-extending fastening hole 37 is defined in the radially outer surface area of the main wall 32a such that the fastening hole 37 radially opposes the tooth base portion 33. The first bearing housing 14 and the second bearing housing 15 are fixed to the stator core 21 preferably by, for example, a fastener such as a bolt 18 inserted into the fastening hole 37.

The tooth base portion 33 protrudes radially inwards from the inner surface of the main wall 32a facing the rotor 12. The tooth base portion 33 is arranged to extend from one axial end of each split core 31 to the other axial end thereof. The tooth overhang portions 34 are arranged to protrude from the tip end of the tooth base portion 33 in the circumferential direction. The tooth overhang portions 34 are arranged to extend from one axial end of each split core 31 to the other axial end thereof.

The insulator 22 is preferably a synthetic-resin-made insulating member provided on the surface of each split core 31 including the core-back portion 32. The insulator 22 is provided with each split core 31 in a single piece through, for example, a molding method. The insulator 22 can also be defined by a pair of individual members which are mounted to the split cores 31 in an axially abutting relationship.

Each of the coils 23 is preferably provided by winding, for a specified number of turns, a conductive wire 23a on the insulator 22 attached to the tooth base portion 33. Each of the coils 23 is provided in each split core 31. The motor 1 preferably includes three sets of coils 23. As the conductive wire 23a, it is possible to use a conductive wire having a diameter of, e.g., about 0.5 mm to about 1 mm.

Figure 5A:
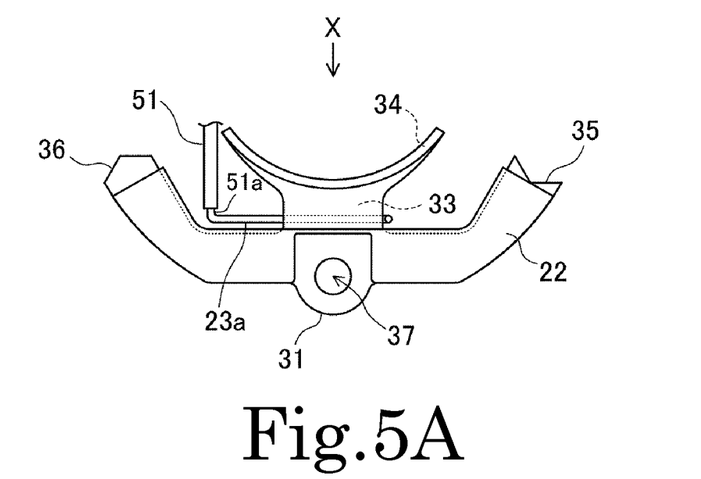
FIG. 5A is schematic diagram showing a winding machine and FIG. 5B is a diagram showing the winding machine as seen in the direction indicated by arrow X in FIG. 5A.
Figure 5B:
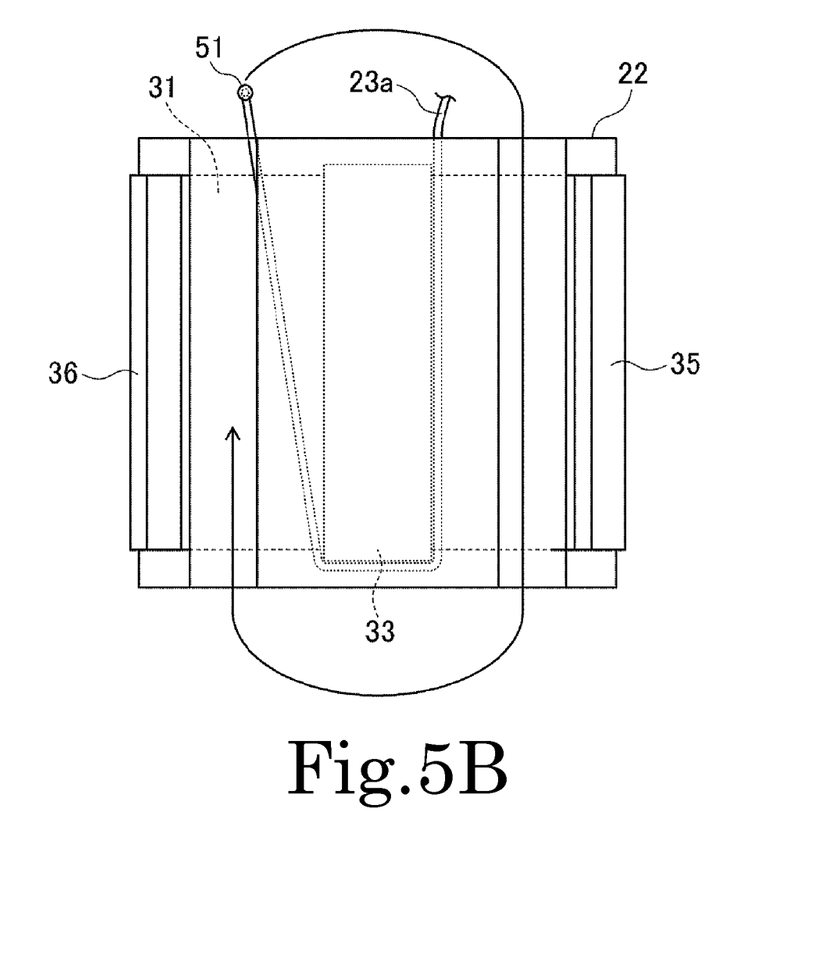

FIG. 5A shows a winding machine and FIG. 5B is a diagram showing the winding machine as seen in the direction indicated by arrow X in FIG. 5A. A process of winding the conductive wire is performed by a dedicated winding machine with respect to each split core 31 as shown in FIG. 5A. The winding machine preferably includes a circular pipe-shaped nozzle 51. The nozzle 51 is arranged to move along a specified orbit by setting the displacement direction and displacement angle thereof in advance. A dispensing hole 51a arranged to dispense the conductive wire 23a there through is provided at the tip end of the nozzle 51. In the state that the tip end of the conductive wire 23a is fixed to the split core 31, the nozzle 51 revolves around the tooth base portion 33 covered with the insulator 22 along a specified orbit as indicated by an arrow in FIG. 5B while dispensing the conductive wire 23a from the dispensing hole 51a.

In order to readily wind the conductive wire 23a in the winding process, the core-back portion 32 and other portions are preferably designed to have specified predetermined dimensions.

Figure 6:
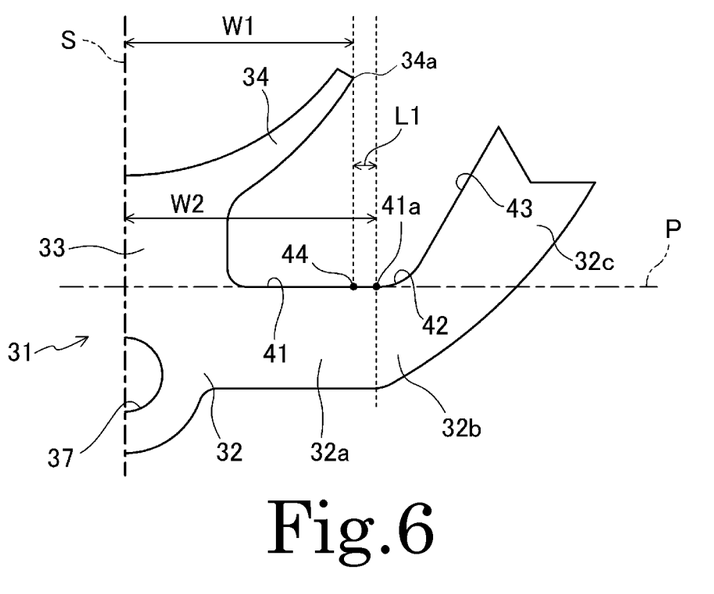
FIG. 6 is a view explaining the dimensions of the split core.

FIG. 6 is a view for explaining the dimensions of the split core 31. As shown in FIG. 6, a pair of orthogonal surface regions 41 having a planar surface shape is provided on the inner surface of the core-back portion 32. The orthogonal surface regions 41 extend from the both sides of the base end of the tooth base portion 33 in the direction orthogonal or substantially orthogonal to the tooth base portion 33. Bending surface regions 42 are arranged to continuously extend from the outer ends 41a of the respective orthogonal surface regions 41 and have a circumferentially-bending curved surface shape. Connecting surface regions 43 continuously extend from the bending surface regions 42 and have a circumferentially-extending planar surface shape. The inner surface of the core-back portion 32 preferably includes the orthogonal surface regions 41, the bending surface regions 42 and the connecting surface regions 43. In the present preferred embodiment of the present invention, the orthogonal surface regions 41 correspond to the inner surface of the main wall 32a, the bending surface regions 42 corresponding to the inner surfaces of the bending walls 32b and the connecting surface regions 43 corresponding to the inner surfaces of the connecting walls 32c. The core-back portion 32 of the present preferred embodiment of the present invention is provided into a wall shape. The radially outer surface of the core-back portion 32 is parallel or substantially parallel to the inner surface thereof. In the present preferred embodiment of the present invention, the radially outer surfaces of the connecting walls 32c are defined to have a cross section of an arc shape that bulges a little radially in a radially outward direction.

The orthogonal surface regions 41 are designed in such a dimension so as to circumferentially protrude beyond the tooth overhang portions 34. More specifically, an imaginary plane P including the orthogonal surface regions 41 is set as shown in FIG. 6. When the tooth overhang portions 34 are projected toward the imaginary plane P in parallel or substantially in parallel to the tooth base portion 33 (in a direction orthogonal or substantially orthogonal to the imaginary plane P), the outer ends 41a of the orthogonal surface regions 41 (the junctures with the bending surface regions 42) are spaced apart from the base end of the tooth base portion 33 and are positioned more outwardly than the projection positions 44 of the tip ends 34a of the tooth overhang portions 34 on the imaginary plane P. The distance between the projection positions 44 and the outer ends 41a is defined as first distance L1.

In other words, when seen in the axial direction, the distance W2 between the centerline S of the tooth base portion 33 and the outer end 41a is set greater than the distance W1 between the centerline S of the tooth base portion 33 and the tip end 34a of the tooth overhang portion 34.

Figure 7:
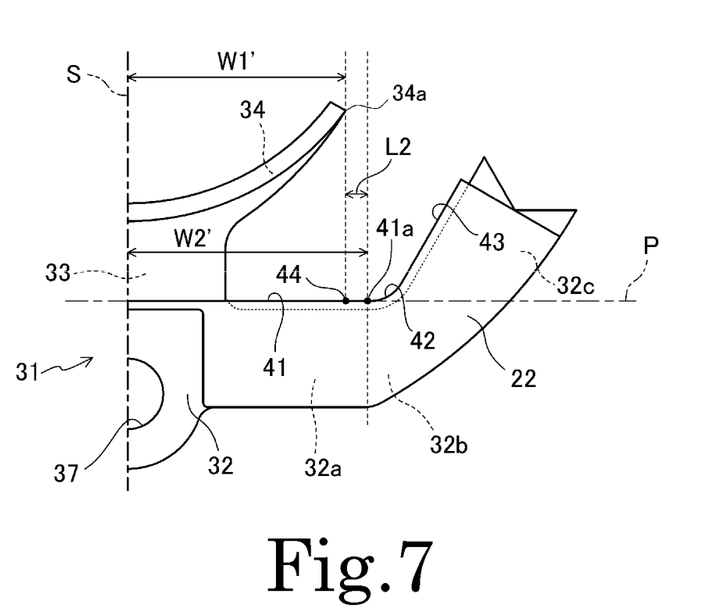
FIG. 7 is a view explaining the dimensions of the split core including an insulator.

FIG. 7 is a diagram explaining an example of the preferred dimensions of the split core including the insulator. Even when the split core 31 is provided with the insulator 22 which covers the surfaces of the core-back portion 32, the tooth base portion 33, and the tooth overhang portions 34, the orthogonal surface regions 41 are designed in such a dimension so as to circumferentially protrude beyond the tooth overhang portions 34. In this state, the distance between the projection positions 44 and the outer ends 41a is defined as second distance L2. The second distance L2 is set to fall within a range of about 1 mm to about 5 mm and more preferably within a range of about 2.5 mm to about 4 mm, for example.

The conductive wire 23a preferably has a diameter of about 0.5 mm to about 1 mm, for example. The outer diameter of the nozzle 51 is preferably about 2 mm to about 3 mm, for example, greater than the diameter of the conductive wire 23a. In other words, the outer diameter of the nozzle 51 in a range of about 2.5 mm to about 4 mm, for example, is suitable for most of the nozzles, which makes various preferred embodiments of the present invention superior in versatility.

In the case where the outer diameter of the nozzle 51 is in a range of about 2.5 mm to about 4 mm, the distance W1' between the centerline S of the tooth base portion 33 and the tip end of the tooth overhang portion 34 and the distance W2' between the centerline S of the tooth base portion 33 and the outer end 41a are equal to or slightly different from the distance W1 and the distance W2 due to the insulator 22 (In general, L2 is smaller than L1).

Since the second distance L2 is greater than the outer diameter of the nozzle 51, the nozzle 51 is arranged such that the nozzle 51 does not make contact with each of the tooth overhang portions 34 when kept parallel or substantially parallel to the tooth base portion 33. Accordingly, the tip end of the nozzle 51 can be inserted to such a position so as to make contact with each of the orthogonal surface regions 41 of the core-back portion 32.

As a consequence, the conductive wire 23a can be uniformly wound on the tooth base portion 33 from the base end to the tip end thereof. This eliminates or substantially eliminates the possibility that the conductive wire 23a will be lopsidedly wound on the tip end region of the tooth base portion 33. Therefore, there is no need to perform such a process of pushing the conductive wire 23a inwards to correct any lopsided winding.

It is only necessary that the nozzle 51 moves inwards and radially outwards while just revolving around the tooth base portion 33. Thus, the wire guiding role of the nozzle 51 is substantially minimized. This eliminates the need to use a winding machine capable of setting a complicated nozzle motion, which assists in simplifying the winding equipment. The winding time is shortened and, therefore, the productivity is improved.

In the stator core 21 of the present preferred embodiment, the dimension of the gap provided between the tip ends of two adjoining tooth overhang portions 34 (the distance L3 between the teeth) when the split cores 31 are connected to one other as shown in FIG. 4 is set smaller than the first distance L1 and the second distance L2.

If the tip ends of the adjoining tooth overhang portions 34 are kept close to each other, cogging is prevented and is magnetically smoothly changed over. This makes it possible to reduce the noise and vibration generated when the motor 1 is driven. The distance L3 between the teeth may be set, e.g., equal to or smaller than about 1 mm.

The stator core 21 and the motor 1 in accordance with the present invention are not limited to the preferred embodiments described above and may include many other configurations.

For example, the cross-sectional shape of the interconnected core-back portions 32 may be substantially triangular, polygonal, or circular. In the core-back portion 32, the magnetic flux density becomes lower as the distance from the inner surface of the core-back portion grows longer. In view of this, it is more efficient that, as in the preferred embodiments described above, the cross-sectional shape of the interconnected core-back portions 32 is substantially hexagonal with the inner and radially outer surfaces of the core-back portions 32 provided parallel or substantially parallel to each other. If the interconnected core-back portions 32 have a hexagonal shape, it is possible to reduce the weight of the core-back portions 32 and to cut down the material cost of the core-back portions 32.

When there is a need to provide a fastening hole 37 in each split core 31, it is preferable to arrange the fastening hole 37 in the area near the radially outer surface of the core-back portion 32 radially opposing to the tooth base portion 33. Magnetic resistance is increased if the fastening hole 37 is defined in the core-back portion 32. Since magnetic flux is divisionally distributed at the both sides of the base end region of the tooth base portion 33, magnetic density remains low at the dividing point of the magnetic flux. If the fastening hole 37 is defined at the dividing point, it is possible to reduce the influence of increased magnetic resistance and to reduce the magnetic loss.

Figure 8:
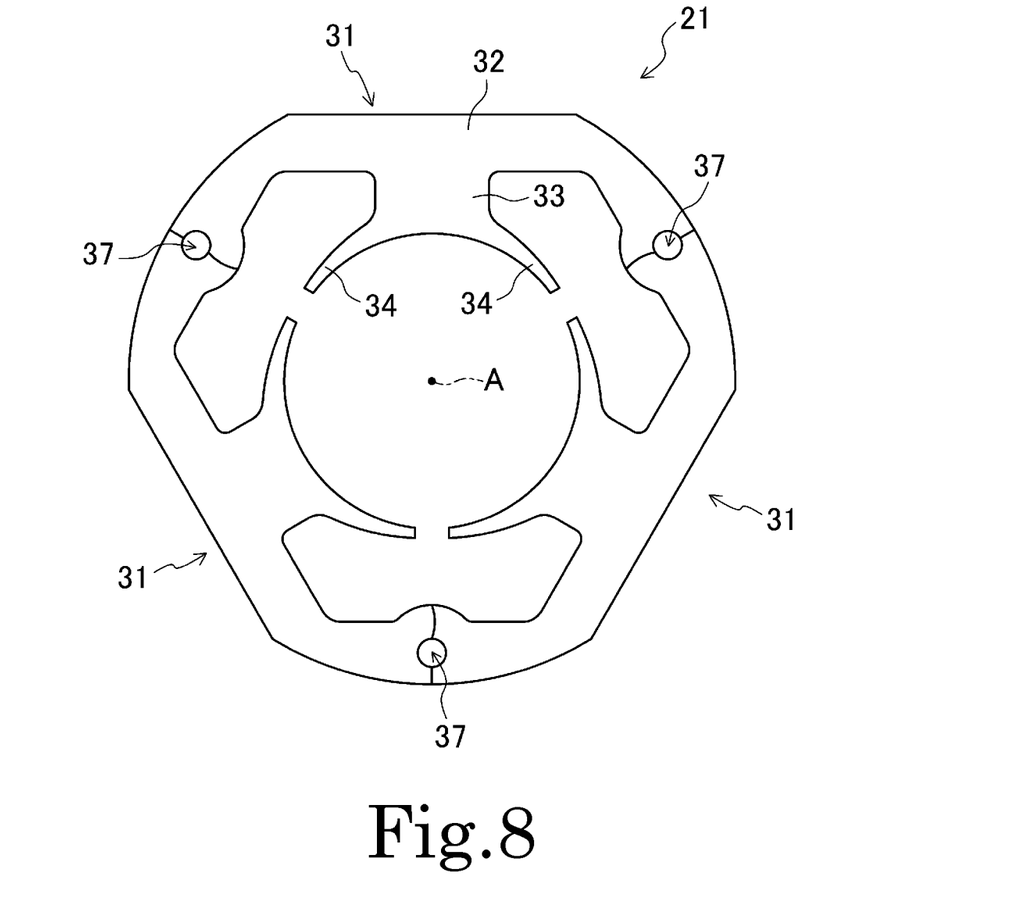
FIG. 8 is a schematic plan view showing a modified example of the stator core.

However, the position of the fastening hole 37 is not limited thereto. For example, as shown in FIG. 8, the fastening hole 37 may be defined in each of the joint portions of the split cores 31 (the circumferential ends of the connecting walls 32c).

In the preferred embodiments described above, the insulator 22 is provided with each split core 31 in a single piece by, for example, a molding method and the insulator 22 is defined by a pair of individual members which are mounted to the split cores 31 in an axially abutting relationship. Alternatively, the insulator 22 may be made of a paper sheet or a polyester insulating sheet or may be provided by applying an insulating paint on the split cores 31.

Various preferred embodiments of the present invention can be used not only in a cleaner but also in, for example, a jet towel or hand dryer and so forth which uses a low-torque, high-speed drive motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator core for a motor, comprising:
three split cores arranged to surround a rotatably-held rotor, each of the split cores including:
a core-back portion including an inner surface facing the rotor;
a tooth base portion protruding radially inwards from the inner surface of the core-back portion; and
a pair of tooth overhang portions protruding from both sides of a tip end of the tooth base portion in a circumferential direction; wherein
the core-back portions are connected through connecting walls arranged at circumferential ends thereof to one another to define a substantially cylindrical shape;
the inner surfaces of the core-back portions include a pair of orthogonal surface regions extending from both sides of a base end of the tooth base portion in a direction orthogonal or substantially orthogonal to the tooth base portion, the orthogonal surface regions extending radially outwards beyond projection positions of tip ends of the tooth overhang portions when the tooth overhang portions are projected on an imaginary plane including the orthogonal surface regions in parallel or substantially in parallel to the tooth base portion;
a half of a total distance between outermost circumferential ends of the pair of orthogonal surface regions minus half of a circumferential distance between both sides of the base end of the tooth base portion is smaller than a total length of the connecting walls; and
a total distance between the imaginary plane and circumferential tips of the connecting walls is larger than a total distance between the imaginary plane and bases of the tooth overhang portions.

2. The stator core of claim 1, wherein each of the split cores includes an insulator provided on a surface thereof, the orthogonal surface regions extending radially outwards beyond projection positions of the tip ends of the tooth overhang portions on the insulator when the tooth overhang portions are projected toward the imaginary plane including the orthogonal surface regions in parallel or substantially in parallel to the tooth base portion.

3. The stator core of claim 2, wherein the inner surfaces of the core-back portions further include circumferentially-curved bending surface regions continuously extending from outer ends of the orthogonal surface regions.

4. The stator core of claim 3, wherein the core-back portions include a radially outer surface extending parallel or substantially parallel to the orthogonal surface regions of the inner surfaces of the core-back portions.

5. The stator core of claim 2, wherein the core-back portions include a radially outer surface extending parallel or substantially parallel to the orthogonal surface regions of the inner surfaces of the core-back portions.

6. The stator core of claim 5, wherein a dimension of a gap provided between the tip ends of the tooth overhang portions adjoining to each other when the split cores are connected to one another is smaller than the distance between each of the projection positions of the tip ends of the tooth overhang portions and each of the outer ends of the orthogonal surface regions.

7. The stator core of claim 2, wherein the core-back portions include an axially-extending fastening hole defined in an area near a radially outer surface of the core-back portions radially opposite to the tooth base portions.

8. The stator core of claim 1, wherein the inner surfaces of the core-back portions further include circumferentially-curved bending surface regions extending continuously from outer ends of the orthogonal surface regions.

9. The stator core of claim 8, wherein a distance between each of the projection positions of the tip ends of the tooth overhang portions and each of the outer ends of the orthogonal surface regions is within a range of about 2 mm to about 3 mm greater than a diameter of a conductive wire wound on the tooth base portion.

10. The stator core of claim 9, wherein a dimension of a gap provided between the tip ends of the tooth overhang portions adjoining to each other when the split cores are connected to one another is smaller than a distance between each of the projection positions of the tip ends of the tooth overhang portions and each of the outer ends of the orthogonal surface regions.

11. The stator core of claim 9, wherein the core-back portions include an axially-extending fastening hole defined in an area near a radially outer surface of the core-back portions radially opposite to the tooth base portions.

12. The stator core of claim 8, wherein the core-back portions include a radially outer surface extending substantially parallel or substantially to the orthogonal surface regions of the inner surfaces of the core-back portions.

13. The stator core of claim 8, wherein a dimension of a gap provided between the tip ends of the tooth overhang portions adjoining to each other when the split cores are connected to one another is smaller than a distance between each of the projection positions of the tip ends of the tooth overhang portions and each of the outer ends of the orthogonal surface regions.

14. The stator core of claim 13, wherein the core-back portions include an axially-extending fastening hole defined in an area near a radially outer surface of the core-back portions radially opposite to the tooth base portions.

15. The stator core of claim 8, wherein the core-back portions include an axially-extending fastening hole defined in an area near a radially outer surface of the core-back portions radially opposite to the tooth base portions.

16. The stator core of claim 1, wherein the core-back portions include a radially outer surface extending parallel or substantially parallel to the orthogonal surface regions of the inner surfaces of the core-back portions.

17. The stator core of claim 16, wherein a dimension of a gap provided between the tip ends of the tooth overhang portions adjoining to each other when the split cores are connected to one another is smaller than a distance between each of the projection positions of the tip ends of the tooth overhang portions and each of the outer ends of the orthogonal surface regions.

18. The stator core of claim 16, wherein the core-back portions include an axially-extending fastening hole defined in an area near a radially outer surface of the core-back portions radially opposite to the tooth base portions.

19. The stator core of claim 1, wherein the core-back portions include an axially-extending fastening hole defined in an area near a radially outer surface of the core-back portions radially opposite to the tooth base portions.

20. The motor comprising the stator core of claim 1.

* * * * *